US012152741B2

(12) United States Patent
Zaremba

(10) Patent No.: US 12,152,741 B2
(45) Date of Patent: Nov. 26, 2024

(54) LIGHT EMITTING DEVICE HAVING A MIXING CHAMBER

(71) Applicant: SIGNIFY HOLDING B.V., Eindhoven (NL)

(72) Inventor: Krzysztof Cezary Zaremba, Bialystok (PL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/768,827

(22) PCT Filed: Oct. 12, 2020

(86) PCT No.: PCT/EP2020/078595
§ 371 (c)(1),
(2) Date: Apr. 13, 2022

(87) PCT Pub. No.: WO2021/074070
PCT Pub. Date: Apr. 22, 2021

(65) Prior Publication Data

US 2024/0093842 A1 Mar. 21, 2024

(30) Foreign Application Priority Data

Oct. 18, 2019 (EP) .................................... 19203981

(51) Int. Cl.
*F21K 9/62* (2016.01)
*F21V 5/00* (2018.01)
(Continued)

(52) U.S. Cl.
CPC ................ *F21K 9/62* (2016.08); *F21V 5/004* (2013.01); *F21V 7/0008* (2013.01); *F21Y 2115/10* (2016.08)

(58) Field of Classification Search
CPC ........... F21V 7/0008; F21V 5/004; F21K 9/62
See application file for complete search history.

(56) References Cited

U.S. PATENT DOCUMENTS 7,874,704 B2 1/2011 Falicoff et al.
7,878,688 B2 * 2/2011 Paulussen ............... F21V 13/02 362/240

(Continued)

FOREIGN PATENT DOCUMENTS

CA 282251 A 8/1928
CN 102149966 A 8/2011

(Continued)

*Primary Examiner* — John W Poos
*Assistant Examiner* — Nathaniel J Lee

(57) ABSTRACT

A light emitting device comprising a mixing chamber (3). The mixing chamber having a bottom surface (31), a light exit window (33) and at least one side wall (32). The at least one side wall extends between the bottom surface and the light exit window. The light emitting device further comprises at least one light source (4) adapted for, in operation, emitting light into the mixing chamber. The at least one side wall (32) comprises an inner surface part (34) that borders the light exit window (33) and that faces an internal space (8) of the mixing chamber. The inner surface part (34) is an asymmetric reflector (9) to reflect a larger amount of incident light back towards the bottom surface (31) than towards the light exit window (33).

11 Claims, 1 Drawing Sheet

(51) Int. Cl.
*F21V 7/00* (2006.01)
*F21Y 115/10* (2016.01)

(56) References Cited

U.S. PATENT DOCUMENTS

| | | | | |
|---|---|---|---|---|
| 2008/0094835 | A1 | 4/2008 | Marra et al. | |
| 2010/0172152 | A1 | 7/2010 | Boonekamp | |
| 2010/0259919 | A1* | 10/2010 | Khazi | F21V 19/0035 362/296.01 |
| 2010/0265701 | A1* | 10/2010 | Man | F21V 7/09 362/346 |
| 2011/0096529 | A1 | 4/2011 | Wheatley et al. | |
| 2011/0216522 | A1* | 9/2011 | Harbers | F21V 7/30 362/84 |
| 2012/0120672 | A1 | 5/2012 | Stagg et al. | |
| 2012/0287624 | A1 | 11/2012 | Harbers | |
| 2012/0327657 | A1 | 12/2012 | Pickard et al. | |
| 2013/0258699 | A1* | 10/2013 | Weaver | F21K 9/62 362/555 |
| 2014/0036494 | A1 | 2/2014 | Holten et al. | |
| 2016/0369973 | A1 | 12/2016 | Gommans | |

FOREIGN PATENT DOCUMENTS

| | | | |
|---|---|---|---|
| CN | 105492821 | A | 4/2016 |
| RU | 2016102340 | A | 8/2017 |
| WO | 2013153534 | A1 | 10/2013 |
| WO | 2013182945 | A1 | 12/2013 |
| WO | 2018081177 | A1 | 5/2018 |

* cited by examiner

LIGHT EMITTING DEVICE HAVING A MIXING CHAMBER

CROSS-REFERENCE TO PRIOR APPLICATIONS

This application is the U.S. National Phase application under 35 U.S.C. § 371 of International Application No. PCT/EP2020/078595, filed on Oct. 12, 2020, which claims the benefit of European Patent Application No. 19203981.6, filed on Oct. 18, 2019. These applications are hereby incorporated by reference herein.

FIELD OF THE INVENTION

The invention concerns light emitting device comprising a mixing chamber having a bottom surface, a light exit window and at least one side wall that extends between the bottom surface and the light exit window, and at least one light source adapted for, in operation, emitting light into the mixing chamber.

BACKGROUND OF THE INVENTION

To achieve high optical efficiencies of mixing chambers for light emitting devices, the sidewalls of these mixing chambers are typically white with a high reflectance. Luminous flux reflected from the side walls of such mixing chambers may exit the mixing chambers at large angles, thereby increasing luminaires luminance at large angles.

US 2016/369973 A1 describes a light emitting device for masking individual light sources of the light emitting device, minimizing the form factor, and achieving a high degree of collimation. The light emitting device comprising a plurality of light sources, each light source of the plurality of light sources being arranged to emit light, and a first and a second secondary optics.

For use in an office environment, a luminaire should be office compliant. This for example means that it should have a Unified Glare Rating (UGR) below a certain limit. The UGR is a method of calculating glare by luminaires, defined by the International Commission on Illumination (CIE). The UGR helps to determine how likely a luminaire is to cause discomfort to those around it. In workplaces, glare is a common problem. For office work areas, the UGR should be kept under 19, while in corridors or common spaces like break-out areas, it may vary between 19 to 25.

Office compliance can be achieved by using a clear optical cover and lenses to reduce the angular output range of the light sources. This will be very efficient, and it will fulfill standard requirements, but such a luminaire will be perceived as a set of high luminance spots. For a pleasant look and feel, the luminance of the light exit window should be as uniform as possible. This can be achieved by using a “milky” cover to provide a Lambertian distribution and a light exit window of high uniformity. However, this may not comply with office regulations in case of a typical lumen output (such as 3500 lumen) and a typical surface area (such as 600 by 600 millimeters).

To achieve office compliance and a pleasant look and feel at the same time, one typically uses a mixing chamber that is white with a high reflectance, and a diffusive foil or sheet that is provided just below an optical cover that is not highly diffusive. The optical cover is typically made from a clear or nearly-clear optical material with optical structures to limit luminous flux radiated at large angles. An example of an optical structure is black pigment, which may be added to the optical cover material to reduce glare, though black pigment has the drawback of decreasing a luminaire’s efficiency. Reduction of glare may also be achieved by decreasing the reflectance of side walls of the mixing chambers, which again has the negative side effect of decreasing efficiency.

SUMMARY OF THE INVENTION

It is an object of the present invention to overcome these problems, and to provide a light emitting device, which overcomes or at least alleviates the problems of the prior art, and which thus has reduced glare without or with very little effect on the efficiency.

According to a first aspect of the invention, this and other objects are achieved by a light emitting device comprising a mixing chamber having a bottom surface, a light exit window and at least one side wall that extends between the bottom surface and the light exit window, and at least one light source adapted for, in operation, emitting light into the mixing chamber, where the at least one side wall comprises an inner surface part that borders the light exit window and that faces an internal space of the mixing chamber, and where the inner surface part is an asymmetric reflector to reflect a larger amount of incident light back towards the bottom surface than towards the light exit window.

By a light exit window is in this connection meant an area, through which light from the mixing chamber may exit the mixing chamber.

Having the inner surface part of the side walls configured using an asymmetric reflector to reflect a larger amount of incident light back towards the bottom surface than towards the light exit window, provides for a decreased amount of light exiting the mixing chamber at large angles, which leads to reduction in glare. Furthermore, returning luminous flux towards the bottom surface allows for at least part of the luminous flux to be recycled, thereby maintaining a high efficiency for the light emitting device.

Particularly, it has been shown that in this way a light emitting device may be provided with which the unified glare rating (UGR) is reduced to 19 or below while the efficiency remains close to 90%. In comparison, at least some of the above mentioned prior art light emitting devices may in fact achieve a comparable UGR, but with efficiencies in the order of just 60 to 70%. Thus, a light emitting device which has reduced glare without or with very little effect on the efficiency is provided for.

By luminous flux exiting the mixing chamber at large angles is in this connection meant luminous flux exiting the light exit window with an angle of 65 degrees or above, where the angle is the angle between the normal of the light exit window and the light exiting, so if light exit parallel to the normal of the light exit window, i.e. perpendicular to the light exit window, there is an angle of 0 degrees.

In an embodiment the asymmetric optical coating is a retroreflector.

A retroreflector achieves the purposes of the invention, by reducing large angle luminous flux, while also allowing for the recycling of luminous flux. In an embodiment the inner surface part is at least partly coated with an asymmetric optical coating.

An asymmetric optical coating is in this connection to be understood as a coating providing for that the angle of incidence for a light ray differs from the angle of reflection for the light ray.

By using an asymmetric optical coating on the inner surface of the mixing chamber a simple solution is achieved, which may reflect a larger amount of incident light towards the bottom surface than towards the light exit window. The use of a coating may also remove the need for structural changes to the mixing chamber to achieve the desired reflectance, thereby keeping the mixing chamber simple to manufacture.

In an embodiment the light emitting device comprises asymmetrical optical elements, the asymmetrical optical elements being placed on the inner surface part of the at least one side wall of the mixing chamber.

Asymmetrical optical elements may by way of non-limiting examples be retroreflective glare shields, retroreflective cups, or retroreflective lamellae. Asymmetrical optical elements achieve the purposes of the invention, by reducing large angle luminous flux, while also allowing for the recycling of luminous flux.

In an embodiment the light emitting device comprises at least two light sources.

By having the light emitting device comprising two light sources a more uniform luminous lux emitted by the light emitting device, may be achieved. Of course, the light emitting device may also comprise three, four, five or more light sources, dependent on the requirements imposed on the light emitting device.

In an embodiment the light emitting device further comprises an optical cover, the optical cover being arranged at or defining at least part of the light exit window of the mixing chamber.

The optical cover may allow for further modulation, such as e.g. diffusion or directional control, of light emitted from the light emitting device.

In an embodiment the optical cover is made from an optically transparent material.

By providing an optically transparent optical cover, protection of the mixing chamber and the light source is achieved, without unnecessary modulation of light emitted from the light emitting device. The optically transparent optical cover may protect the mixing chamber and the light source from dust or other foreign objects, thereby preventing foreign objects from contaminating and/or damaging the internal space of the light emitting device. Furthermore, an optically transparent optical cover assures that no unneeded light losses happens, when light passes through the optical cover.

In an embodiment the optical cover comprises a microlens optical cover.

With a microlens optical cover is meant an optical cover, which comprises at least one lens, and typically an array of lenses, with or each with a diameter of less than one millimeter.

A microlens optical cover may be used to realize uniform illumination from the light emitting device. A microlens optical cover may also be used to collimate light exiting through the light exit window.

In an embodiment the light emitting device further comprises a diffusive foil.

A diffusive foil helps to achieve a uniform illumination from the light emitting device.

In an embodiment the diffusive foil is placed in a distance from the light exit window of the mixing chamber towards the bottom surface of the mixing chamber.

Placing the diffusive foil a distance from the light window assures that large angle luminous flux transmitted through the diffusive foil is reflected off the side walls before exiting the light exit window, instead of being transmitted at large angles through the light exit window.

In an embodiment the light emitting device further comprises at least one flange, the at least one flange projecting inwardly towards a center axis of the mixing chamber from the side wall, and the at least one flange either covers part of the light exit window or defines part of the light exit window. Put in other words, the flange thus extends in parallel with the light exit window.

Thereby, the glare may be reduced even further with little effect on the efficiency of the light emitting device.

According to a second aspect of the invention, this and other objects are achieved by a luminaire, light fixture or lamp comprising a light emitting device according to the invention.

According to a third aspect of the invention, this and other objects are achieved by a luminaire, light fixture or lamp for use in an office environment and comprising a light emitting device according to the invention.

It is noted that the invention relates to all possible combinations of features recited in the claims. Other objectives, features and advantages of the present inventive concept will appear from the following detailed disclosure, from the attached claims as well as from the drawings. A feature described in relation to one of the aspect may also be incorporated in the other aspect, and the advantage of the feature is applicable to all aspects in which it is incorporated.

BRIEF DESCRIPTION OF THE DRAWINGS

This and other aspects of the present invention will now be described in more detail with reference to the appended drawings showing an embodiment of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
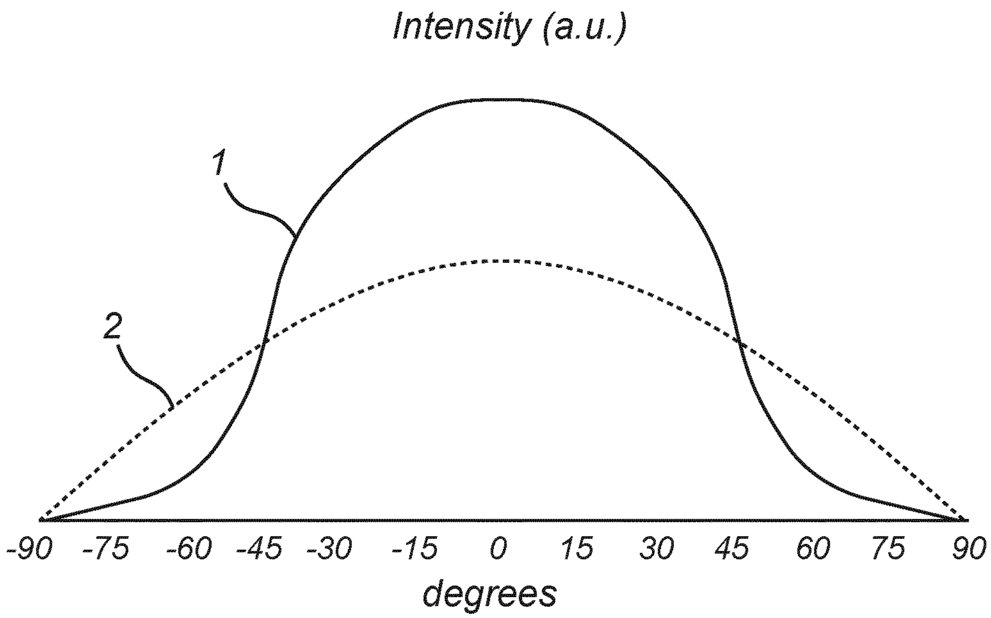
FIG. 1 shows two intensity distributions graphs or curves, the first graph depicting an intensity distribution suitable for an office luminaire, and the second graph depicting an intensity distribution for a standard Lambertian intensity distribution.

Referring initially to FIG. 1 two intensity distribution graphs or curves are shown. The first graph 1 illustrates an intensity distribution suitable for an office luminaire according to the invention, and the second graph 2 illustrates an intensity distribution for a lamp with a standard Lambertian intensity distribution.

A lamp with a standard Lambertian intensity distribution, as depicted on the second graph 2 of FIG. 1, exhibits an intensity distribution which is directly proportional to the cosine of the angle between the direction of emitted light and the surface normal of the light emitting surface, as appears from the graph. This means that there is a maximal intensity distribution at an angle equal to zero, i.e. perpendicular to the light emitting surface. Another feature of a lamp with a Lambertian intensity distribution is that it has the same radiance when viewed from any angle. In other words, the luminance of a lamp with a Lambertian intensity distribution is isotropic. The reason for the radiance being the same from any angle is because, although the emitted power from a given area element is reduced by the cosine of the emission angle, the solid angle, subtended by the surface of the area element visible to the viewer, is reduced by the same amount. Therefore, a problem arises for lamps with Lambertian intensity distributions, namely that glare becomes an issue. Since Lambertian lamps have glare issues, they are not preferred for use in an office environment.

Instead, for an office environment a suitable intensity distribution would be one as depicted on the first graph 1 of FIG. 1. Where a large intensity is experienced at small angles, and a steep decline in intensity happens for larger angles, thereby lessening glare from the office luminaire. With this disclosure a light emitting device 10 suitable for an office environment is described.

Figure 2:
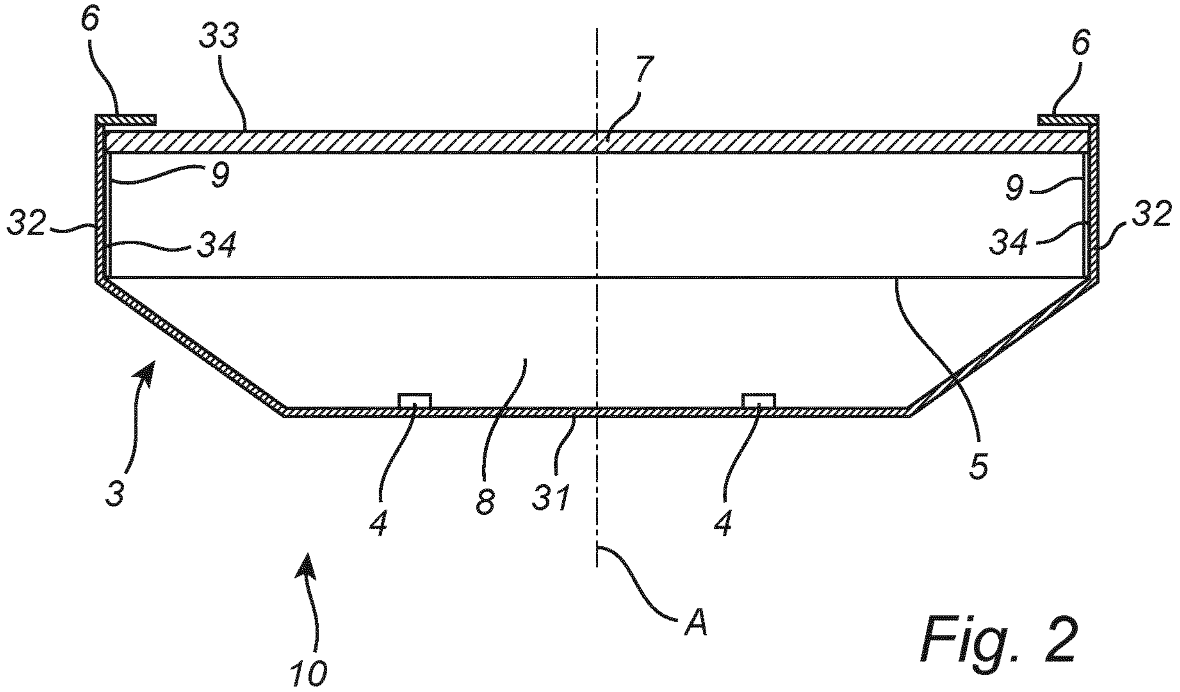
FIG. 2 shows a schematic cross-sectional view of an embodiment of a light emitting device according to the invention.

Referring to FIG. 2 a schematic cross-sectional view of an embodiment of a light emitting device 10 according to the invention is shown. The light emitting device 10 comprises a mixing chamber 3. The mixing chamber 3 comprises a bottom surface 31, a light exit window 33 and a side wall 32. The mixing chamber 3 defines an internal space 8.

In the embodiment shown in FIG. 1, the mixing chamber 3 has a generally cylindrical shape, which is tapered towards the bottom surface 31, and thus comprises one circumferential side wall 32. The mixing chamber is, however, not limited to this shape, but it is within the scope of this invention that the mixing chamber may also assume any other shape, such as a box shape, a pyramid shape, or a spherical shape. The mixing chamber may also comprise more than one side wall 32, e.g. two, three, four or more side walls.

The bottom surface 31 of the light emitting device 10 shown in FIG. 2 is provided with two light sources 4. The light sources 4 may be LEDs. The light sources 4 may, in operation, emit light of any color, such as white. The light sources 4 are configured to, in operation, emit light into the mixing chamber 3. The light sources 4 are in FIG. 2 shown placed on the bottom surface 31. However, it is also within the scope of the invention for the light sources to be placed on other surfaces of the mixing chamber 3. For example, the light source(s) may also be placed above the bottom surface 31, e.g. on an additional surface provided for this purpose, in an orientation such that the light sources, in operation, emit light towards the bottom surface 31, the bottom surface 31 thereby acting as a secondary light source. Another possibility is that the mixing chamber may be provided with additional surfaces, e.g. niches, for housing the light source(s).

The side wall 32 of the mixing chamber 3 extends between the bottom surface 31 and the light exit window 33. In the case of the mixing chamber having a substantially cylindrical shape, the mixing chamber may only comprise one side wall 32. In the case of the mixing chamber having other shapes it may comprise more than one side wall. The side wall 32 comprises an inner surface part 34 that borders the light exit window 33 and that faces an internal space 8 of the mixing chamber 3. The inner surface part 34 may be the full inner surface of the side wall 32 or only a part of the inner surface of the side wall 32, as long as it is a part that borders the light exit window 33. The inner surface part 34 is adapted for reflecting a larger amount of incident light from the light sources 4 back towards the bottom surface 31 than towards the light exit window 33 using an asymmetric reflector 9. By having a larger amount of incident light being reflected towards the bottom surface 31, where the light sources 4 are located, than towards the light exit window 33, it may assure that incident light reflected from the inner surface part 34 does not leave the light exit window 33 at a large angle, for instance at angles larger than 65°, thereby reducing glare. To achieve the desired reflectance of the inner surface part 34 different approaches may be used. One approach is to coat the inner surface part 34 with an asymmetric optical coating, for example a retroreflective coating. Another approach would be to provide the inner surface part 34 with one or more asymmetrical optical elements, the optical elements being placed on the inner surface part 34 of the at least one side wall 32 of the mixing chamber 3.

The light emitting device 10 shown in FIG. 2 further comprises an optical cover 7. The optical cover 7 is an optional element. The optical cover 7 is arranged at the light exit window 33 and may thus cover or define at least part of the light exit window 33 of the mixing chamber 3. In the embodiment shown in FIG. 2, the optical cover 7 covers or defines the whole of the light exit window 33. The optical cover 7 may be made of an optically transparent material, which allows light to pass through with minimum losses.

The light emitting device 10 shown in FIG. 2 further comprises a diffusive foil 5. The diffusive foil 5 is an optional element. The diffusive foil 5 is placed a distance from the light exit window 33 of the mixing chamber 3 in a direction towards the bottom surface 31 of the mixing chamber 3.

The light emitting device 10 shown in FIG. 2 further comprises a flange 6. The flange 6 is an optional element. As shown in FIG. 2, one circumferential flange 6 is provided for. Alternatives include that the light emitting device 10 may comprise two or more flanges or a plurality of flange segments together forming a flange, which may be interrupted by spaces placed with regular or irregular intervals. The flange 6 projects from the side wall 32. The flange 6 projects towards a center axis A of the light emitting device 10. The flange 6 is made from optically non-transparent material. The flange 6 forms a rim which in the embodiment shown in FIG. 2 covers part of the light exit window 33. Alternatively, the flange 6 may form part of the light exit window 33. The flange 6 thus extends in parallel with the light exit window 33.

The light emitting device 10 may be provided in a luminaire, light fixture, or lamp. Such a luminaire, light fixture or lamp may be used in an office environment.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:

a mixing chamber having a horizontal bottom surface, a light exit window and at least one side wall that extends between the bottom surface and the light exit window, wherein at least a section of said side wall defines a vector that is essentially orthogonal to a plane defined by said horizontal bottom surface and at least one light source adapted for, in operation, emitting light into the mixing chamber, wherein the at least one side wall comprises an inner surface part that borders the light exit window and that faces an internal space of the mixing chamber, wherein the inner surface part is an asymmetric reflector in which the incidence for a light ray differs from the angle of reflection for the light ray such that a larger amount of incident light reflects back towards the bottom surface than towards the light exit window, and wherein the asymmetric reflector is a retroreflector, or the inner surface part is at least partly coated with an asymmetric optical coating, or the light emitting device comprises asymmetrical optical elements, the asymmetrical optical elements being placed on the inner surface part of the at least one side wall of the mixing chamber.

2. The light emitting device according to claim 1, wherein the light emitting device comprises at least two light sources.

3. The light emitting device according to claim 2, wherein the light emitting device further comprises an optical cover, the optical cover being arranged at or defining at least part of the light exit window of the mixing chamber.

4. The light emitting device according to claim 3, wherein the optical cover is optically transparent.

5. The light emitting device according to claim 3, wherein the optical cover comprises a microlens optical cover.

6. The light emitting device according to claim 3, wherein the light emitting device comprises at least one flange, the at least one flange being attached directly to at least one side wall and projecting from said at least one side wall inwardly towards a center axis (A) of the mixing chamber, and wherein the optical cover is held in place at least in part by said flange.

7. The light emitting device according to claim 1, wherein the light emitting device further comprises a diffusive foil.

8. The light emitting device according to claim 7, wherein the diffusive foil is placed at a distance from the light exit window of the mixing chamber towards the bottom surface of the mixing chamber.

9. A luminaire, light fixture or lamp comprising a light emitting device according to claim 1.

10. A luminaire, light fixture or lamp according to claim 9 for use in an office environment.

11. A light emitting device comprising:

a mixing chamber having a horizontal bottom surface, a light exit window, and at least one side wall that extends between the bottom surface and the light exit window, and at least one light source adapted for, in operation, emitting light into the mixing chamber, wherein the at least one side wall comprises an inner surface part that borders the light exit window and that faces an internal space of the mixing chamber, a section of said inner surface part being vertical with respect to the horizontal bottom surface, wherein the inner surface part is an asymmetric reflector in which the incidence for a light ray differs from the angle of reflection for the light ray such that a larger amount of incident light reflects back towards the horizontal bottom surface than towards the light exit window, and wherein the asymmetric reflector is a retroreflector, or the inner surface part is at least partly coated with an asymmetric optical coating, or the light emitting device comprises asymmetrical optical elements, the asymmetrical optical elements being placed on the inner surface part of the at least one side wall of the mixing chamber.

* * * * *